(12) United States Patent
Vowe et al.

(10) Patent No.: US 12,536,090 B2
(45) Date of Patent: Jan. 27, 2026

(54) WATCHDOG CIRCUIT AND METHOD FOR OPERATING A WATCHDOG CIRCUIT

(71) Applicant: Infineon Technologies AG, Neubiberg (DE)

(72) Inventors: Achim Vowe, Merching (DE); Anjana Ramamoorthy, Munich (DE)

(73) Assignee: Infineon Technologies AG, Neubiberg (DE)

( * ) Notice: Subject to any disclaimer, the term of this patent is extended or adjusted under 35 U.S.C. 154(b) by 703 days.

(21) Appl. No.: 17/949,283

(22) Filed: Sep. 21, 2022

(65) Prior Publication Data
US 2023/0089129 A1 Mar. 23, 2023

(30) Foreign Application Priority Data
Sep. 21, 2021 (DE) .................... 10 2021 124 387.4

(51) Int. Cl.
| | | |
|---|---|---|
| G06F 9/44 | (2018.01) | |
| G06F 11/34 | (2006.01) | |
| G11C 7/22 | (2006.01) | |

(52) U.S. Cl.
CPC ............ *G06F 11/3495* (2013.01); *G11C 7/22* (2013.01)

(58) Field of Classification Search
CPC .................................................. G06F 11/3495
USPC ............................................................ 718/1
See application file for complete search history.

(56) References Cited

U.S. PATENT DOCUMENTS

| | | | |
|---|---|---|---|
| 2004/0078731 | A1 | 4/2004 | Becher et al. |
| 2009/0198389 | A1 | 8/2009 | Kirchhof-Falter et al. |
| 2009/0300435 | A1 | 12/2009 | Karner et al. |
| 2012/0110388 | A1* | 5/2012 | Lavery ................ G06F 11/0757 714/47.1 |

FOREIGN PATENT DOCUMENTS

| | | |
|---|---|---|
| DE | 10049441 A1 | 6/2002 |
| DE | 102005008975 A1 | 8/2006 |
| DE | 102005048037 A1 | 4/2007 |

* cited by examiner

*Primary Examiner* — Timothy A Mudrick
(74) *Attorney, Agent, or Firm* — Eschweiler & Potashnik, LLC

(57) ABSTRACT

A watchdog circuit for monitoring a plurality of processes. The watchdog circuit is configured to provide a periodic signal with an adjustable fixed time interval to a control circuit. The control circuit is configured to receive the periodic signal from the timer and use periodic signal to monitor the plurality of processes. Each of the plurality of processes has a planned process duration. The fixed time interval is set to be longer than the longest planned process duration of the plurality of planned process durations.

20 Claims, 6 Drawing Sheets

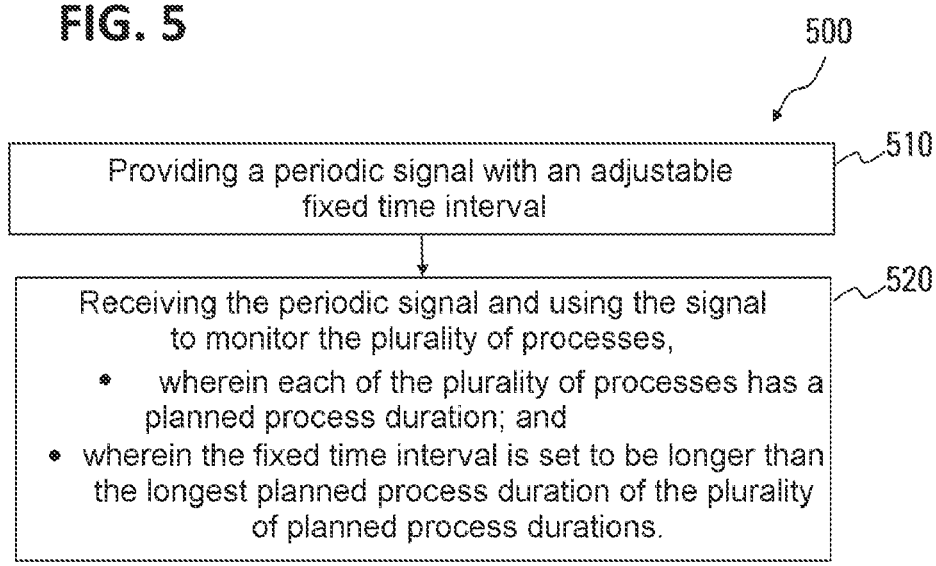

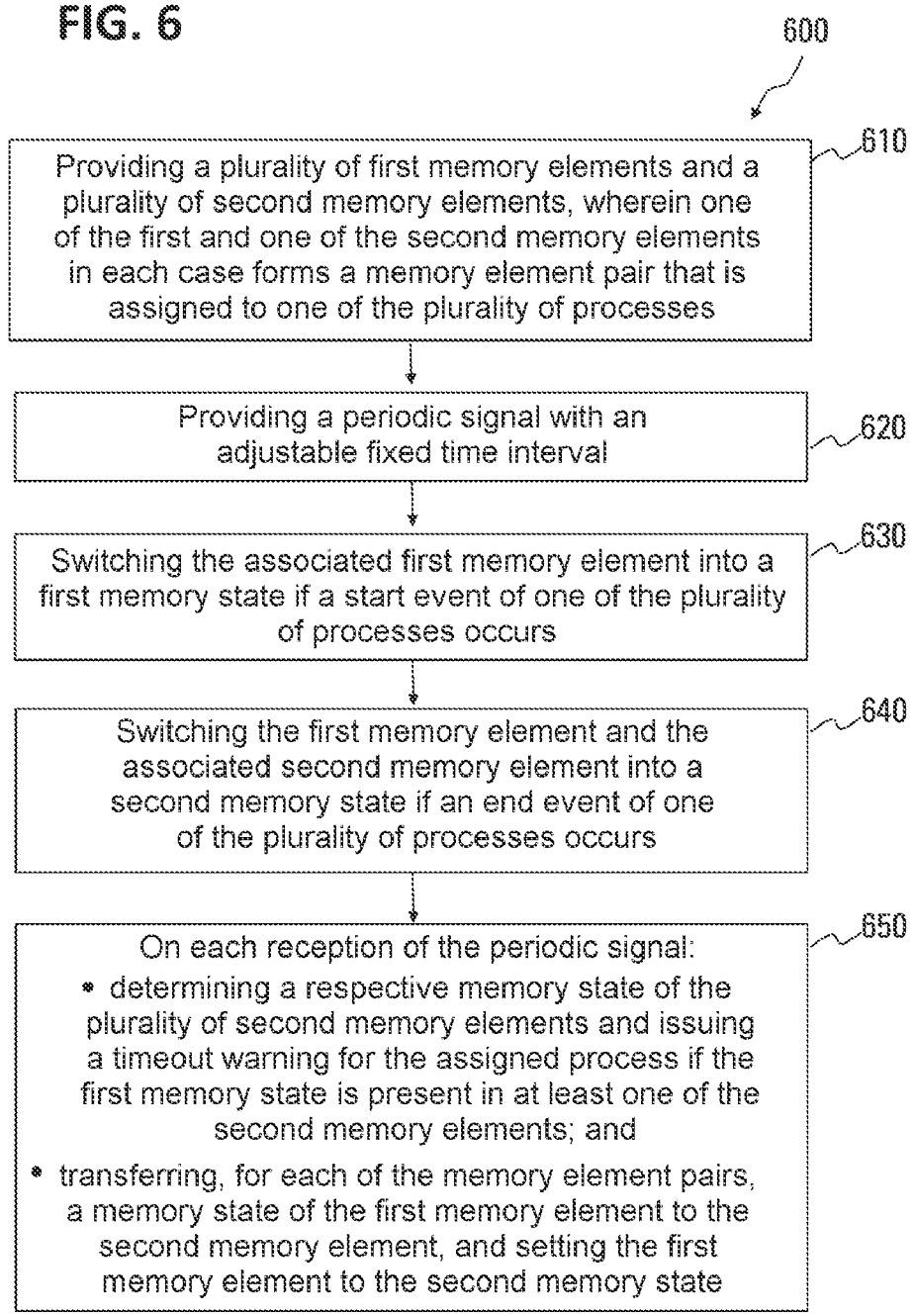

WATCHDOG CIRCUIT AND METHOD FOR OPERATING A WATCHDOG CIRCUIT

REFERENCE TO RELATED APPLICATIONS

This application claims priority to German Application 10 2021 124 387.4, filed on Sep. 21, 2021. The contents of the above-referenced patent application is hereby incorporated by reference in its entirety.

TECHNICAL FIELD

The disclosure relates to a watchdog circuit and a method for operating a watchdog circuit.

BACKGROUND

In processors that run a large number of different processes, it may be necessary, for example to maintain operational reliability, to monitor each of the different individual processes for a timeout in their process execution.

A device (such as a circuit) which is configured for such a monitoring function is usually referred to as a watchdog (or watchdog circuit, watchdog device, or similar).

A watchdog according to the prior art typically detects a start state or a start event of a process and registers a correctly timed arrival—or absence—of an end state or end event. If the expected end state or end event fails to occur within a permitted maximum time, the watchdog issues an alarm.

The watchdog is typically configured in such a way that a counter is configured such that on the start event it starts counting at the clock rate of a timer, e.g. counts down from a start value that corresponds to an accepted duration of execution for the process, and issues the alarm when a target value is reached (e.g. counting down to zero). The alarm output is blocked if the end event is detected before the target value (e.g. zero) is reached, which causes the counter to be reset to the start value.

SUMMARY OF THE DISCLOSURE

For each individual process, and thus for each pair of start and end events assigned to each other, a separate time-out monitoring device, i.e. a separate watchdog, is configured, i.e. a separate counter with a start value matching the acceptable process duration.

In the case of a large number of executable processes, this will require a large chip area.

In various exemplary embodiments, a watchdog circuit for monitoring a plurality of processes is provided, which allows a very large number of processes to be monitored with regard to their execution times, while incurring only minimal costs.

In various exemplary embodiments a watchdog circuit for monitoring a plurality of processes is provided, which provides a common counter for all processes to be monitored for timeouts.

In various exemplary embodiments the watchdog circuit can comprise a timer that is configured to provide a periodic signal with an adjustable fixed time interval to a control circuit, and the control circuit that is configured to receive the periodic signal from the timer and use it to monitor the plurality of processes, each of the plurality of processes having a planned process duration and the fixed time interval being set to be longer than the longest planned process duration of the plurality of planned process durations.

In various exemplary embodiments the watchdog circuit can have a plurality of first memory elements and a plurality of second memory elements, wherein one of the first memory elements and one of the second memory elements in each case form a memory element pair that is assigned to one of the plurality of processes, a timer configured to provide a periodic signal with an adjustable fixed time interval to a control circuit, the control circuit, which is configured to switch the first memory element of the assigned memory element pair into a first memory state if a start event of one of the plurality of processes occurs, to switch the first memory element and the second memory element of the assigned memory element pair into a second memory state if an end event of one of the plurality of processes occurs, and on each receipt of the signal from the timer, to determine a memory state of the plurality of second memory elements and issue a timeout warning for the assigned process if the first memory state is present in at least one of the second memory elements, and for each of the memory element pairs to transfer a memory state of the first memory element to the second memory element and to put the first memory element into the second memory state.

In addition, methods for operating a watchdog circuit to monitor a plurality of processes are provided, which use, for example, the watchdog circuits described above.

The processes to be monitored can include, for example, receiving data, further processing of data (e.g. communication data), e.g. decoding or similar.

In various exemplary embodiments, the process monitoring can be provided as a hardware-based function.

Exemplary embodiments of the disclosure are shown in the drawings and will be explained in more detail in the following.

BRIEF DESCRIPTION OF THE DRAWINGS

In the drawings

FIGS. 5 and 6 each show a flowchart of a method for operating a watchdog circuit.

DESCRIPTION

Figure 1:
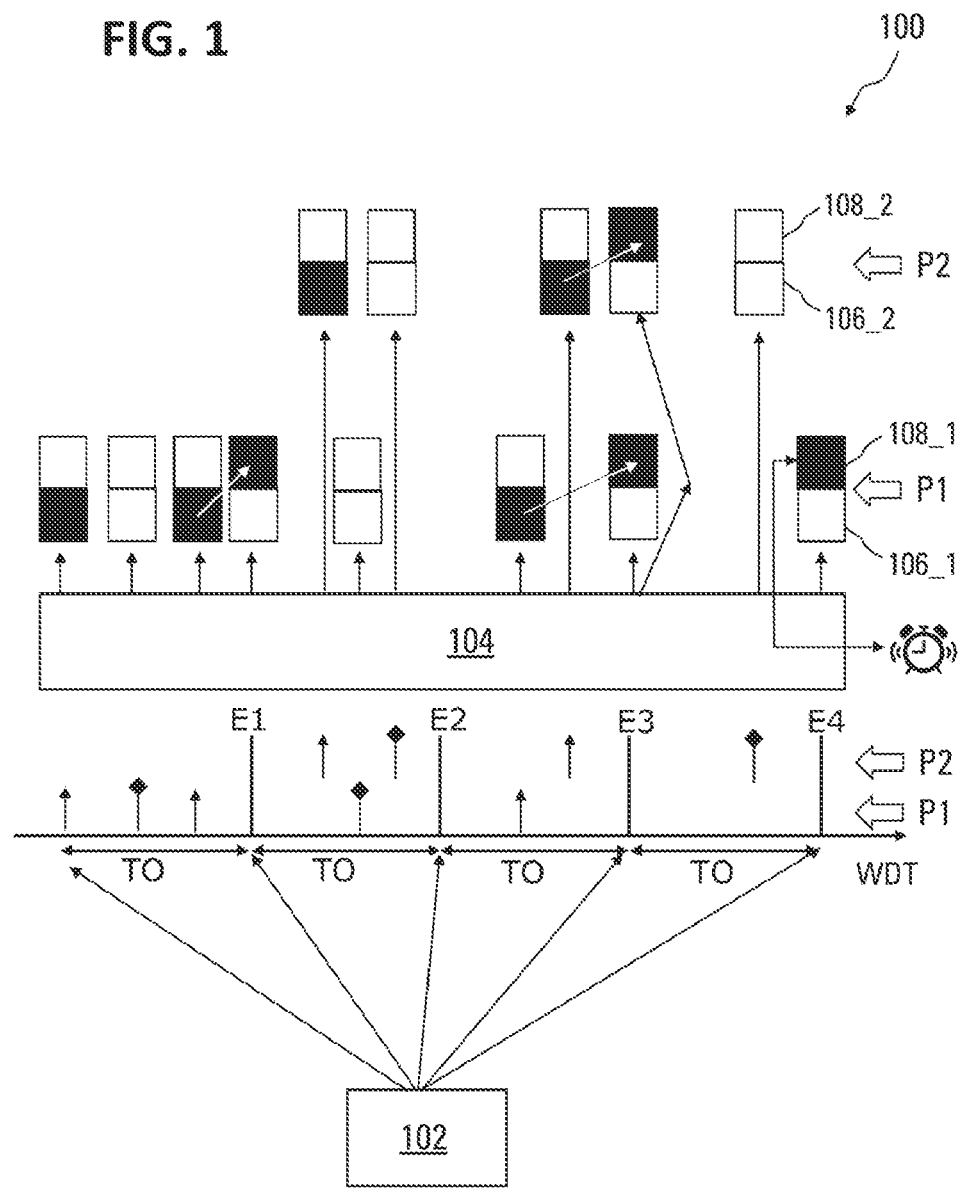
FIGS. 1 to 4 each show an illustration of a watchdog circuit according to various exemplary embodiments.

In the detailed description that follows, reference will be made to the attached drawings, which form part of this application and in which specific embodiments in which the disclosure may be realized are shown for illustration purposes. In this respect, directional terms such as "at the top", "at the bottom", "in front", "behind", "frontal", "rear", etc. are used with respect to the orientation of the figures being described. Because components of embodiments can be positioned in a number of different orientations, the directional terminology is used for illustration purposes only, and is in no way restrictive. It is understood that other embodiments can be used and structural or logical changes can be made without departing from the scope of protection of the present disclosure. It goes without saying that the features of the various exemplary embodiments described herein can be combined with one another, unless specifically stated otherwise. The following detailed description is therefore not to be understood in a restrictive sense, and the scope of protection of the present disclosure is defined by the attached claims.

For the purposes of this description, the terms "connected" and "coupled" are used to describe both a direct and an indirect connection, as well as a direct or indirect coupling. In the figures, identical or similar elements are labeled with identical reference numerals, where this is appropriate.

In various exemplary embodiments, the watchdog circuit can provide a time signal that has a periodic time interval which is set to be longer than the planned execution time of the process among the monitored processes that is expected to last the longest, i.e., that has the longest predicted process duration.

The periodic time interval can be achieved, for example, by appropriately defining start and target values of a counter, which counts, for example at the clock rate of a clock signal generator (clock), from the start value to the target value (e.g. counts down from a start value greater than zero to zero, or counts up from zero to a target value).

A product consisting of the clock period and a difference between the start and target values can be configured such that the product is longer than the longest planned process duration among the plurality of planned process durations (one per process from the plurality of monitored processes).

The periodic signal can be used by a control circuit to perform periodic monitoring functions and to detect a timeout by means of the monitoring functions.

Described in simple terms, the watchdog circuit can use two memory elements (per process to be monitored) and a time signal that is provided at an interval which is longer than the longest expected process duration for the processes, in such a way that the memory elements can be used to detect if a process execution spans more than one time signal interval.

In various exemplary embodiments, therefore, only one counter is required for the timer, as opposed to one counter for each process to be monitored in the prior art. Depending on the nature of the start event, it may be sufficient to provide only a single memory element (e.g., a flip-flop) to capture a plurality of processes with regard to timeouts (for processes with a non-static start event, two flip-flops may be required).

Since the monitoring is so inexpensive, a plurality of processes can be monitored simultaneously, possibly even processes that are currently not monitored for reasons of cost or storage space. This increases operational reliability. It may be possible to deploy this without the need for additional hardware.

FIGS. 1 to 4 each show an illustration of a watchdog circuit 100 according to various exemplary embodiments. Each of the watchdog circuits 100 can be configured to monitor a plurality of processes P1, P2, . . . , Pn (collectively referred to as P).

The watchdog circuit 100 (refer to FIG. 2, for example) has a plurality of first memory elements 106_1, 106_2, and a plurality of second memory elements 108_1, 108_2. The reference sign 106 is used to refer to the totality of the first memory elements (or for general reference to an individual first memory element). The reference sign 108 is used to refer to the totality of the second memory elements (or for general reference to an individual first second element).

One of the first memory elements 106 and one of the second memory elements 108 can each form a memory element pair that is assigned to one of the plurality of processes P.

Figure 2:
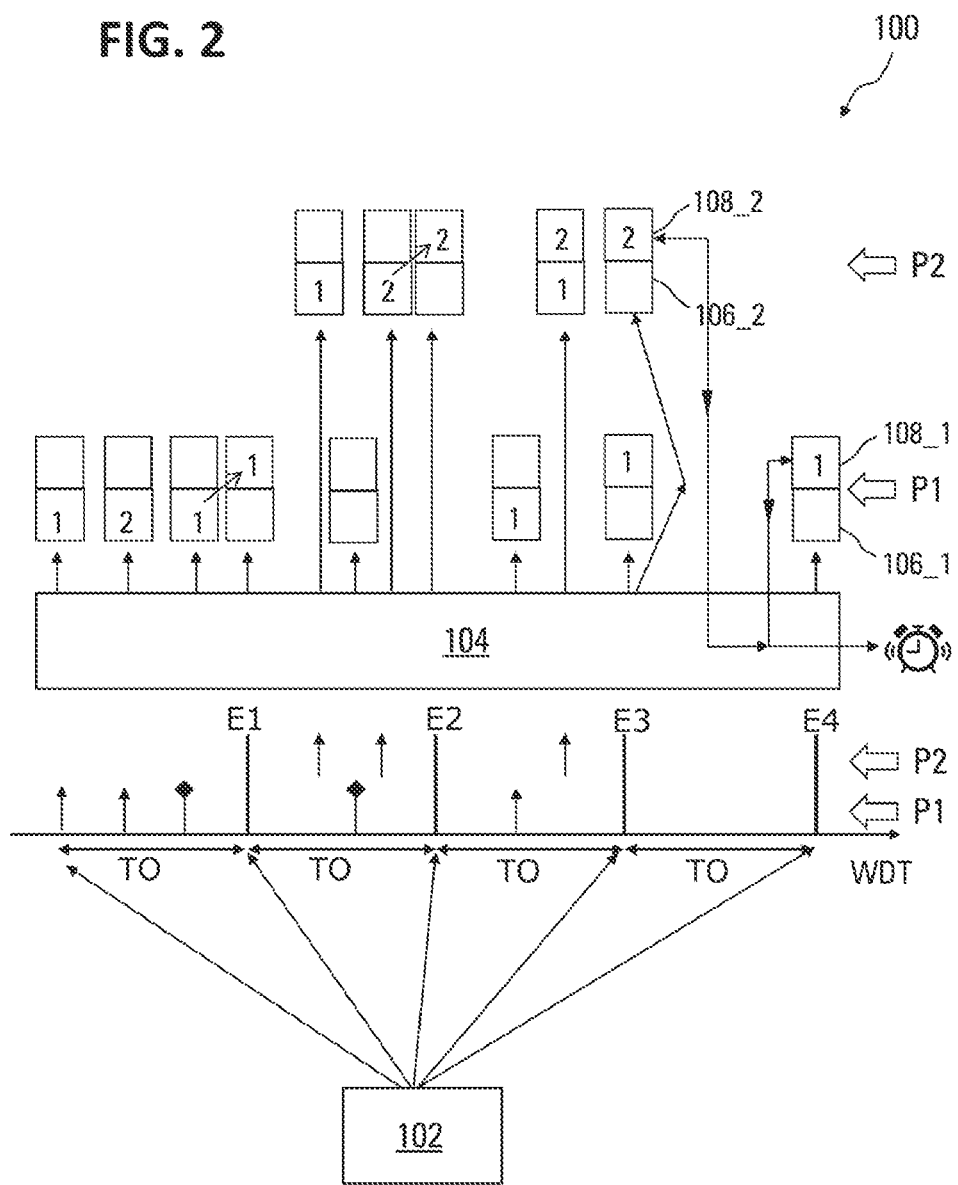

In FIG. 2, by way of example the first memory element 106_1 and the second memory element 108_1 are assigned to the first process P1.

The plurality of first memory elements 106 and/or the plurality of second memory elements 108 can each be formed by a plurality of memory cells, for example as a plurality of flip-flops, for example with a single first flip-flop per process P, and with a single second flip-flop per process P. This is illustrated in FIG. 1.

In various exemplary embodiments, the plurality of first memory elements 106 and/or the plurality of second memory elements 108 can each have a plurality of flip-flops or other types of memory (e.g. multivibrators), for example to store numerical values in bitwise form. The numerical values entered in the memory elements 106 and 108 in FIG. 2 can be stored in this form, for example.

The memory elements 106, 108 can be configured to evaluate pulse-like events (e.g. as single pulses) as start events of the monitored processes P and to record them in the memory elements 106, 108. For example, an arrival of a signal at a data input or, for example, reaching an End-of-Frame of a received message can form such a pulse-like signal. For example, an associated end event (illustrated as a short vertical line with a diamond at the top) can be the completion of processing of the data or message, for example, using a state machine.

In various exemplary embodiments, the plurality of the first memory elements 106 can be configured as memory (e.g. as a register, e.g. as a FIFO memory) that stores data statically or quasi-statically. In such a case, for example, the presence of data in the memory is or can be detected as a static start signal of the monitored process P. Accordingly, a separate memory element (e.g. a flip-flop) for storing the start signal can be omitted, because the element that is placed in the static state already serves as the first memory element 106. An associated end event can be, for example, a completion of processing of the data or message, e.g. by means of a state machine.

In various exemplary embodiments, a watchdog circuit 100 can have both at least one memory element 106 for storing a pulsed-like start signal as well as at least one memory element 106 for storing a static start signal. In other words, the processes P monitored by the watchdog circuit 100 can comprise both those that generate a single pulse as a start signal and processes P that have a stationary event as a start signal.

The watchdog circuit 100 can also have a timer 102 which is configured to provide a periodic signal with an adjustable fixed time interval TO to a control circuit 104.

The adjustable fixed time interval TO can be set, for example, as a number of clock cycles of a clock signal generator (clock).

A product of a (known) clock period and a number of cycles, which form a difference between a start and a target value, for example, can be configured such that the product is longer than the longest planned process duration Temax among the plurality of planned process durations TeP1, TeP2, TeP3, . . . , TePn (one per process P of the plurality of monitored processes P). An example of this is illustrated in FIG. 3.

Figure 3:
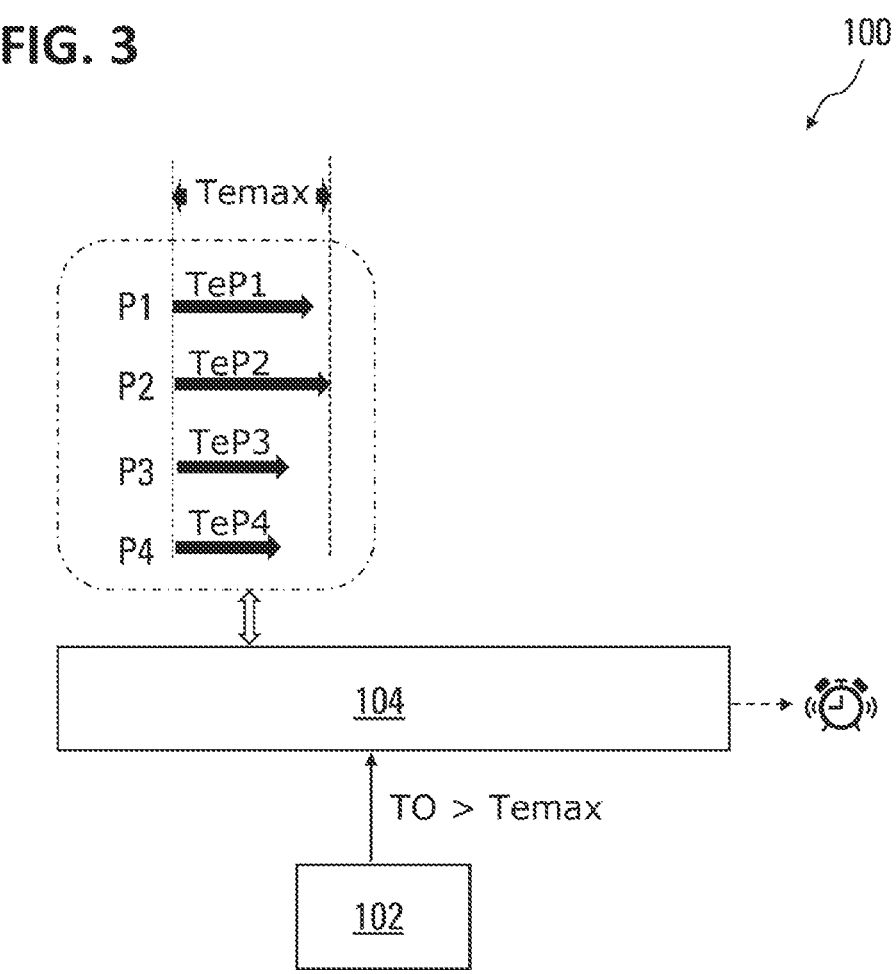

The watchdog circuit 100 in FIG. 3 comprises a timer 102 that is configured to provide a periodic signal with an adjustable fixed time interval TO to a control circuit 104, and the control circuit 104, which is configured to receive the periodic signal from the timer and use it to monitor the plurality of processes P, wherein each of the plurality of processes P has a designated process duration TeP1, TeP2, TeP3, . . . , and wherein the fixed time interval TO is set such that it is longer than the longest planned process duration Temax of the plurality of planned process durations TeP1, TeP2, TeP3, . . . (which in the example from FIG. 3 is TeP2 of the process P2).

Figure 4:
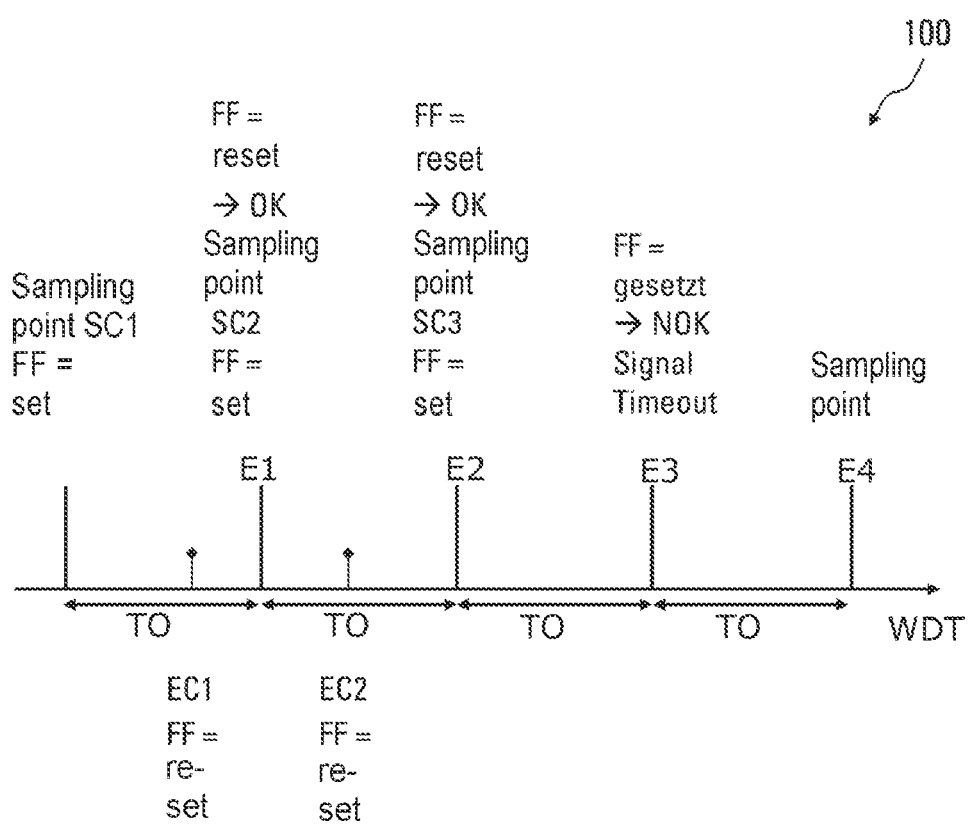

The watchdog circuit 100 can also comprise the control circuit 104, which can be configured to switch the first memory element 106 of the assigned memory element pair into a first memory state if a start event of one of the plurality of processes P has occurred (these are indicated in FIGS. 1 and 2 with upward pointing arrows above the watchdog timeline WDT and labeled as SC in FIG. 4).

This is indicated in FIG. 1 by black shading, in FIG. 2 as an increment of a counter value by one.

If an end event from one of the plurality of processes occurs, the first memory element 106 and the second memory element 108 of the assigned memory element pair can be switched into a second memory state (indicated by no coloring).

Each time the signal is received from the timer 102 (this is illustrated in FIG. 1 and FIG. 2 as event E1, E2, . . . , E4), a memory state of each of the plurality of second memory elements 108 can be determined, for example by means of the control circuit 104, shown in FIG. 1 and FIG. 2 as arrows, and if the first memory state (black shading, numerical value greater than zero) is present in at least one of the second memory elements 108, a warning can be output due to timeout of the assigned process P.

The warning (e.g. an alarm) can be output via the control circuit 104 and is symbolized in FIG. 1 and FIG. 2 by an alarm clock. This applies to the events/times E4 for process P1 in FIG. 1, E3 for process P2 in FIG. 2, and the time E4 for process P1 in FIG. 2.

Also at the times E1 and E2, which are shown in FIG. 1 and FIG. 2, the control circuit 104 determines the memory state of each of the second memory elements 108. However, since these do not give rise to a warning, their testing has been omitted from the figures for the sake of clarity.

In cases where at times E1 or E2 the second memory element 108 is shown with the first memory state (in FIG. 1 for process P1 at E1 and at E3, and for process P2 at E3; in FIG. 2 for process P1 at E1 and for process P2 at E2), the second storage element 108 has been reassigned the respective first memory state based on the memory state of the assigned first memory element 106 at the particular time. This is illustrated by the arrows from the first memory element 106_1 to the second memory element 108_1 (or 106_2 to 108_2).

Furthermore, on each receipt of the signal from the timer 102, for each of the memory element pairs a memory state of the first memory element 106 can be transferred to the second memory element 108, and the first memory element 106 can be set to the second memory state (shown with no coloring or without a numerical value greater than zero).

FIG. 4 shows an exemplary embodiment in which the first memory element 106 registers a stationary state, e.g. in which (user) data is written to a memory, for example for further processing. Each start signal SC1, SC2, etc. can be generated by determining at each time E1, E2, . . . specified by the fixed time interval TO whether the start condition is present (e.g. data has been stored in memory). As a result, the first memory element 106 (for example, the memory) is evaluated as being set, i.e. as being in the first memory state, and its state (e.g. set, as appropriate) is transferred to the second memory element (e.g. the associated flip-flop).

The end event (indicated in FIG. 4 by EC1 or EC2 and as a short vertical line with a diamond at the top) can include, for example, outputting the data from the memory, clearing the memory, transferring data from the memory to a receiver, etc. and can cause the control circuit 104 to set the second memory element 108 (here labeled FF for flip-flop) to the second state (labeled as reset).

If the second memory element 108 (the flip-flop) is encountered in the first state (set) when one of the specified times E1, E2, etc. is reached, the warning is generated by the control circuit 104. This occurs in the exemplary embodiment from FIG. 4 at E3, because no end event EC occurred in the period between E2 and E3.

The control circuit 104 can also be configured to determine the memory state of the first memory element 106 of the assigned memory element pair if the end event occurs before the first memory element 106 and the second memory element 108 are switched to the second memory state, and to issue a warning if both the first memory element 106 and the second memory element 108 are in the second state.

This is because the presence of an end event without an associated start event may indicate a malfunction, which relates, for example, to a type of malfunction other than a timeout.

In various embodiments, the watchdog circuit 100 can therefore have a sequence checking element, which ensures that the events are encountered in the correct sequence.

Each of the plurality of processes P can have a planned process duration, wherein the adjustable fixed time interval can be greater than the longest planned process duration of the plurality of planned process durations.

The first and second memory elements are each configured to store a numerical value, wherein switching the first memory element of the assigned memory element pair into the first memory state is configured as an increase in the numerical value, wherein switching the first memory element and the second memory element of the assigned memory element pair into the second memory state comprises a decrease in the numerical value, and wherein determining the respective memory state of the plurality of second memory elements comprises determining whether the numerical value for at least one of the second memory elements is greater than zero.

The watchdog circuit 100 can be formed as an integral component of a system, which can be a processor, a controller, and/or a system-on-chip, for example.

FIG. 5 shows a flowchart 500 of a method for operating a watchdog circuit for monitoring a plurality of processes.

The method comprises providing a periodic signal with an adjustable fixed time interval (510), receiving the periodic signal and using the signal to monitor the plurality of processes, wherein each of the plurality of processes has a planned process duration, and wherein the fixed time interval is set so that it is longer than the longest planned process duration of the plurality of planned process durations (520).

FIG. 6 shows a flowchart 600 of a method for operating a watchdog circuit for monitoring a plurality of processes.

The method comprises providing a plurality of first memory elements and a plurality of second memory elements, wherein one of the first memory elements and one of the second memory elements in each case form a memory element pair that is assigned to one of the plurality of processes (610), providing a periodic signal with an adjustable fixed time interval (620), switching the assigned first memory element to a first memory state if a start event of one of the plurality of processes occurs (630), switching the first memory element and the assigned second memory element to a second memory state if an end event of one of the plurality of processes occurs (640), and on each receipt of the periodic signal, determining a respective memory state of the plurality of second memory elements and issuing a timeout warning for the assigned process if the first memory state is present in at least one of the second memory elements, and transferring, for each of the memory element pairs, a memory state of the first memory element to the second memory element, and setting the first memory element to the second memory state (650).

In the following text, a summary of some exemplary embodiments is given.

Exemplary embodiment 1 is a watchdog circuit for monitoring a plurality of processes. The watchdog circuit comprises a timer that is configured to provide a periodic signal with an adjustable fixed time interval to a control circuit, and the control circuit that is configured to receive the periodic signal from the timer and use it to monitor the plurality of processes, each of the plurality of processes having a planned process duration and the fixed time interval being set to be longer than the longest planned process duration of the plurality of planned process durations.

Exemplary embodiment 2 is a watchdog circuit for monitoring a plurality of processes. The watchdog circuit has a plurality of first memory elements and a plurality of second memory elements, wherein one of the first memory elements and one of the second memory elements in each case form a memory element pair that is assigned to one of the plurality of processes, a timer that is configured to provide a periodic signal with an adjustable fixed time interval to a control circuit, the control circuit, which is configured to switch the first memory element of the assigned memory element pair into a first memory state if a start event of one of the plurality of processes occurs, to switch the first memory element and the second memory element of the assigned memory element pair into a second memory state if an end event of one of the plurality of processes occurs, and on each receipt of the signal from the timer to determine a memory state of the plurality of second memory elements and issue a timeout warning for the assigned process if the first memory state is present in at least one of the second memory elements, and for each of the memory element pairs to transfer a memory state of the first memory element to the second memory element and to put the first memory element into the second memory state.

Exemplary embodiment 3 is a watchdog circuit according to exemplary embodiment 2, wherein the control circuit is also configured to determine the memory state of the first memory element of the assigned memory pair if the end event occurs before the first and second memory elements are switched to the second memory state and to issue a warning if both the first memory element and the second memory element are in the second state.

Exemplary embodiment 4 is a watchdog circuit according to exemplary embodiment 2 or 3, wherein the plurality of first memory elements comprises at least one flip-flop.

Exemplary embodiment 5 is a watchdog circuit according to exemplary embodiment 4, wherein the start event for at least one of the plurality of processes is formed as a single pulse and the associated first memory element comprises or consists of the flip-flop.

Exemplary embodiment 6 is a watchdog circuit according to one of the exemplary embodiments 2 to 5, wherein the plurality of first memory elements comprises at least one register.

Exemplary embodiment 7 is a watchdog circuit according to exemplary embodiment 6, wherein the start event for at least one of the plurality of processes is formed as a static operation and the assigned first memory element comprises or consists of the register.

Exemplary embodiment 8 is a watchdog circuit according to exemplary embodiment 7, wherein the static operation comprises a data storage operation of data in the register.

Exemplary embodiment 9 is a watchdog circuit according to one of the exemplary embodiments 2 to 8, wherein the adjustable fixed time interval can be set as a number of clock cycles of a clock signal generator.

Exemplary embodiment 10 is a watchdog circuit according to one of the exemplary embodiments 2 to 9, wherein each of the plurality of processes has a planned process duration, and wherein the adjustable fixed time interval is greater than the longest planned process duration of the plurality of planned process durations.

Exemplary embodiment 11 is a watchdog circuit according to one of the exemplary embodiments 2 to 10, wherein the first and second memory elements are each configured to store a numerical value, wherein switching the first memory element of the assigned memory element pair into the first memory state is configured as an increase in the numerical value, wherein switching the first memory element and the second memory element of the assigned memory element pair into the second memory state comprises a decrease in the numerical value, and wherein determining the respective memory state of the plurality of second memory elements comprises determining whether the numerical value for at least one of the second memory elements is greater than zero.

Exemplary embodiment 12 is a watchdog circuit according to one of the exemplary embodiments 2 to 11, which is formed as an integral component of a system, wherein the system is one of a group of systems, the group comprising a processor, a controller, and a system-on-chip.

Exemplary embodiment 13 is a method for operating a watchdog circuit for monitoring a plurality of processes. The method comprises providing a periodic signal with an adjustable fixed time interval, receiving the periodic signal and using the signal to monitor the plurality of processes, wherein each of the plurality of processes has a planned process duration, and wherein the fixed time interval is set so that it is longer than the longest planned process duration of the plurality of planned process durations.

Exemplary embodiment 14 is a method for operating a watchdog circuit for monitoring a plurality of processes. The method comprises providing a plurality of first memory elements and a plurality of second memory elements, wherein one of the first memory elements and one of the second memory elements in each case form a memory element pair that is assigned to one of the plurality of processes, providing a periodic signal with an adjustable fixed time interval, switching the assigned first memory element into a first memory state if a start event of one of the plurality of processes occurs, switching the first memory element and the assigned second memory element into a second memory state if an end event of one of the plurality of processes occurs and, on each receipt of the periodic signal, determining a respective memory state of the plurality of second memory elements and issuing a timeout warning for the assigned process if the first memory state is present in at least one of the second memory elements, transferring, for each of the memory element pairs, a memory state of the first memory element to the second memory element, and setting the first memory element to the second memory state.

Exemplary embodiment 15 is a method according to exemplary embodiment 14, which comprises, if the end event occurs before the first and second memory elements are switched to the second memory state, determining a memory state of the first memory element of the assigned memory pair and issuing a warning if both the first memory element and the second memory element are in the second state.

Exemplary embodiment 16 is a method according to exemplary embodiment 15, wherein the plurality of first memory elements comprises at least one flip-flop.

Exemplary embodiment 17 is a method according to exemplary embodiment 15, wherein the start event for at least one of the plurality of processes is formed as a single pulse and the assigned first memory element comprises or consists of the flip-flop.

Exemplary embodiment 18 is a method according to one of the exemplary embodiments 14 to 17, wherein the plurality of first memory elements comprises at least one register.

Exemplary embodiment 19 is a method according to exemplary embodiment 18, wherein the start event for at least one of the plurality of processes is formed as a static operation and the associated first memory element comprises or consists of the register.

Exemplary embodiment 20 is a method according to exemplary embodiment 19, wherein the static operation is a data storage operation of data in the register.

Exemplary embodiment 21 is a method according to one of the exemplary embodiments 14 to 20, wherein the adjustable fixed time interval can be set as a number of clock cycles of a clock signal generator.

Exemplary embodiment 22 is a method according to one of the exemplary embodiments 14 to 21, wherein each of the plurality of processes has a planned process duration; and wherein the adjustable fixed time interval is greater than the longest planned process duration of the plurality of planned process durations.

Exemplary embodiment 23 is a method according to one of the exemplary embodiments 14 to 22, wherein the first and second memory elements are each configured to store a numerical value, wherein switching the first memory element of the assigned memory element pair to the first memory state is configured as an increase in the numerical value, wherein switching the first memory element and the second memory element of the assigned memory element pair to the second memory state comprises a decrease in the numerical value, and wherein determining the respective memory state of the plurality of second memory elements comprises determining whether the numerical value for at least one of the second memory elements is greater than zero.

Additional advantageous designs of the device are obtained from the description of the method and vice versa.

What is claimed is:

1. A watchdog circuit for monitoring a plurality of processes, comprising:
   a plurality of respective memory element pairs, each respective memory element pair assigned to a respective process of the plurality of processes, each memory element pair comprising a first memory element and a second memory element;
   a timer configured to provide a periodic signal with an adjustable fixed time interval, wherein the adjustable fixed time interval is set to be longer than a longest planned process duration of the plurality of processes;
   a control circuit configured to, for each memory element pair,
      set the first memory element to a first memory state in response to occurrence of a start event for the assigned process; and
      set the first memory element and the second memory element to a second memory state in response to occurrence of an end event for the assigned process; and
      responsive to the periodic signal,
         generate an alarm signal when the second memory element is set to the second memory state; and
         set the second memory element to the memory state of the first memory element and set the first memory element to the second memory state.

2. A watchdog circuit for monitoring a plurality of processes, comprising:
   a plurality of respective memory element pairs assigned to respective processes of the plurality of processes, each memory element pair comprising a first memory element and a second memory element;
   a timer configured to provide a periodic signal; and
   a control circuit coupled to the timer and configured to:
   for each memory element pair,
      in response to occurrence of a start event for the assigned process, switch the first memory element into a first memory state; and
      in response to occurrence of an end event for the assigned process, switch the first memory element and the second memory element into a second memory state; and
   on each receipt of the periodic signal from the timer:
      issue a timeout warning when the first memory state is present in at least one of the second memory elements;
      for each of the memory element pairs, transfer a memory state of the first memory element to the second memory element and put the first memory element into the second memory state.

3. The watchdog circuit of claim 2, wherein the control circuit is further configured to determine a memory state of the first memory element of the memory element pair when the end event occurs before the first memory element and the second memory element are switched into the second memory state, and to issue a warning when both the first memory element and the second memory element are in the second memory state.

4. The watchdog circuit of claim 2, wherein the plurality of memory element pairs comprises at least one flip-flop.

5. The watchdog circuit of claim 2, wherein the start event is signaled by a single pulse.

6. The watchdog circuit of claim 2, wherein the plurality of memory element pairs comprises at least one register.

7. The watchdog circuit of claim 2, wherein the start event is signaled by a static operation.

8. The watchdog circuit of claim 2, wherein the periodic signal has an adjustable fixed time interval that can be set as a number of clock cycles of a clock signal generator.

9. The watchdog circuit of claim 2,
   wherein the plurality of processes have a plurality of planned process durations, respectively; and
   wherein the periodic signal has an adjustable fixed time interval that is greater than a longest planned process duration of the plurality of planned process durations.

10. The watchdog circuit of claim 2,
    wherein the first memory elements and the second memory elements are each configured to store a numerical value;
    wherein the switching of the first memory element into the first memory state is configured as an increase in the numerical value;

wherein the switching of the first memory element and the second memory element into the second memory state comprises a decrease in the numerical value; and wherein the control circuit is configured to issue the timeout warning when the numerical value for at least one of the second memory elements is greater than zero.

11. The watchdog circuit of claim 2, which is formed as an integral component of a system, the system being one of a group of systems, and the group comprising:
a processor;
a controller; and
a system-on-chip.

12. A method for operating a watchdog circuit for monitoring a plurality of processes, the method comprising:
providing a plurality of respective memory element pairs, each respective memory element pair assigned to a respective process of the plurality of processes, each memory element pair comprising a first memory element and a second memory element;
providing a periodic signal with an adjustable fixed time interval, wherein the adjustable fixed time interval is set to be longer than a longest planned process duration of the plurality of processes;
receiving the periodic signal and using the periodic signal to monitor the plurality of processes,
for each memory element pair,
setting the first memory element to a first memory state in response to occurrence of a start event for the assigned process; and
setting the first memory element and the second memory element to a second memory state in response to occurrence of an end event for the assigned process; and
responsive to the periodic signal,
generating an alarm signal when the second memory element is set to the second memory state; and
setting the second memory element to the memory state of the first memory element and set the first memory element to the second memory state.

13. A method for operating a watchdog circuit for monitoring a plurality of processes, the method comprising:
a plurality of respective memory element pairs assigned to respective processes of the plurality of processes, each memory element pair comprising a first memory element and a second memory element;
providing a periodic signal;
for each memory element pair,
in response to occurrence of a start event for the assigned process, switching the first memory element into a first memory state;
in response to occurrence of an end event for the assigned process, switching the first memory element and the second memory element into a second memory state; and
on each reception of the periodic signal:
issuing a timeout warning for the assigned process when the first memory state is present in at least one of the second memory elements; and
transferring, for each of the memory element pairs, a memory state of the first memory element to the second memory element, and setting the first memory element to the second memory state.

14. The method of claim 13, further comprising:
when the end event occurs before the first and second memory elements are switched into the second memory state, determining a memory state of the first memory element of the memory element pair, and issuing a warning when both the first memory element and the second memory element are in the second memory state.

15. The method of claim 13, wherein the start event for at least one of the plurality of processes is signaled by a single pulse and the first memory element comprises a flip-flop.

16. The method of claim 13, wherein the plurality of memory element pairs comprises at least one register.

17. The method of claim 13, wherein the start event for at least one of the plurality of processes is signaled by a static operation and the first memory element comprises at least one register.

18. The method of claim 17, wherein the static operation is a data storage operation of data in the register.

19. The method of claimed in claim 13,
wherein the plurality of processes have a plurality of planned process durations, respectively; and
wherein the periodic signal has an adjustable fixed time interval is greater than a longest planned process duration of the plurality of planned process durations.

20. The method of claim 13,
wherein the first and second memory elements are each configured to store a numerical value;
wherein the switching of the first memory element into the first memory state is configured as an increase in the numerical value;
wherein the switching of the first memory element and the second memory element of the memory element pair into the second memory state comprises a decrease in the numerical value; and
issuing the timeout warning when the numerical value for at least one of the second memory elements is greater than zero.

* * * * *